United States Patent [19]
Werth

[11] Patent Number: 5,840,270
[45] Date of Patent: *Nov. 24, 1998

[54] CATALYTIC METHOD OF GENERATING HYDROGEN

[75] Inventor: John Werth, Princeton, N.J.

[73] Assignee: H Power Corporation, Belleville, N.J.

[*] Notice: The term of this patent shall not extend beyond the expiration date of Pat. No. 5,510,201.

[21] Appl. No.: 477,521

[22] Filed: Jun. 7, 1995

Related U.S. Application Data

[63] Continuation-in-part of PCT/US93/03825, Apr. 23, 1993 and continuation-in-part of Ser. No. 52,561, Apr. 23, 1993, abandoned.

[51] Int. Cl.$^6$ .............................................. C01B 3/08
[52] U.S. Cl. .............................................. 423/658; 429/17
[58] Field of Search ........................ 429/17; 423/658

[56] References Cited

U.S. PATENT DOCUMENTS

| | | | |
|---|---|---|---|
| 5,346,778 | 9/1994 | Ewan et al. ......................... | 429/17 |
| 5,513,600 | 5/1996 | Teves ................................. | 123/3 |

FOREIGN PATENT DOCUMENTS

| | | | |
|---|---|---|---|
| 479307 | 12/1951 | Canada .............................. | 423/658 |
| 119591 | 10/1918 | United Kingdom ............... | 423/658 |
| 424622 | 5/1933 | United Kingdom ............... | 423/658 |
| 527243 | 10/1940 | United Kingdom ............... | 423/658 |

*Primary Examiner*—Wayne Langel
*Attorney, Agent, or Firm*—Salzman & Levy

[57] ABSTRACT

The catalyzed method of this invention features a method for operating an electrical automotive vehicle. The method of the invention utilizes a hydrogen-air fuel cell to power an electrical automotive vehicle having electrical drive motors. Hydrogen to fuel the fuel cell is supplied onboard by a bed of iron that is made to react with $H_2O$ in the presence of an alkaline catalyst at temperatures not exceeding approximately 250° C. The preferred alkali hydroxide is the hydroxide of potassium in a range of concentrations between 50 to 60 percent by weight, with the preferred concentration being about 53%. The hydrogen for fueling the fuel cell is generated onboard the automobile, in situ, by using a storage compartment containing iron materials. The hydrogen is generated by passing heated water over freshly ground iron, which then becomes iron oxide. The vehicle's operator obtains a fresh charge of the new iron materials from an iron fuel station for placement in a compartment of the vehicle. The iron materials of this invention may comprise in situ freshly-ground particulates. The particles range in diameter size from approximately 25 to 1,200 $\mu$m, with an average-sized distribution having at least twenty per cent (20%) of the particles less than 300 $\mu$m in diameter. It is preferable that at least 50% are less than 300 $\mu$m in diameter. The average particle density ranges approximately from about 1 to 7.8 g/cc, with a non-compressed packed particle density ranging from about 1.5 to 3.5 g/cc. The particles have a surface area greater than approximately 0.001 meters$^2$/g.

30 Claims, 2 Drawing Sheets

CATALYTIC METHOD OF GENERATING HYDROGEN

RELATED PATENT APPLICATION

This patent application is a continuation-in-part of PCT application, PCT/US 93/03825 (which was filed Apr. 23, 1993); and the U.S. patent application, Ser. No. 08/052,561 (which was also filed Apr. 23, 1993, abandoned). Each was assigned to a common assignee.

FIELD OF THE INVENTION

The present invention pertains to a hydrogen-generating process wherein water is passed over a bed of iron material in the presence of a catalyst and, more particularly, to a new, catalyzed method of generating hydrogen, utilizing lower temperatures when the water reacts with the iron material, so that the conversion rate of iron to iron oxide exceeds 2.0%/minute at temperatures generally less than 250° C.

BACKGROUND OF THE INVENTION

The generation of hydrogen by passing steam at or about 700° C. over a bed of iron is well known in the art. It is generally a simple way of obtaining hydrogen, which is drawn off and dried. One of the primary potential uses of hydrogen can be for powering land vehicles and, in particular, electrical automobiles.

The electrical automobile is currently under intense development due to the twin needs to reduce air pollution and conserve fuel resources. One of the major difficulties in the development of the electrical automobile is supplying the power for the electrical drive motors. Such power is currently furnished by batteries. Present battery technology, however, is not capable of providing at a practical cost the energy needed to run the automobile over extended distances.

This invention shows that hydrogen can be generated in situ, i.e., onboard a vehicle, and then passed into a hydrogen-air fuel cell to generate electricity to power electrical drive motors.

One well-known method of hydrogen generation, no longer in use, i.e., generating hydrogen by passing high-temperature steam over a bed of iron, can be too expensive and impractical for automotive purposes. The containers needed to generate and supply the high-temperature steam can make the cost of running the vehicle too expensive. Further, the use of high-temperature steam can be dangerous.

The present invention is the development of a new hydrogen-generating process utilizing either low-temperature steam or water. Being able to use a low-temperature process in electrical vehicles is valuable, since it is quite practical. In the first instance, the need to expend energy in vaporizing the water and bringing it to a high temperature is eliminated. Secondly, a process that does not generate steam is inherently simpler and safer; it also does not require special pressure fittings and piping. Thirdly, the utilization of high temperatures almost always results in reactors that are large and heavy, since insulation is usually required to avoid heat loss; obviously, the added weight and space of large reactors are extremely detrimental in producing a low-cost, efficient, electrical vehicle.

The low-temperature process of this invention is made possible by a unique catalyst, which greatly enhances the $H_2O$ and iron reaction. The catalyst of this invention comprises an alkaline hydroxide and, more particularly, the preferred hydroxide of potassium, which is a true catalyst that is not consumed in the reaction. This catalyst works with ordinary commercial sponge iron powder.

In addition to the distinctive catalyst of this invention, it is additionally contemplated that an added benefit may be obtained by using a more active form of iron, to wit, freshly-ground particles of iron which increase the reactivity thereof. Such active iron is able to enter into the water/iron reaction at lower-than-normal temperatures, even without catalysis. In this additional or optional embodiment, the iron particles are ground when the vehicle is initially powered and throughout vehicular operation. The instantaneous grinding of the iron particles in situ is useful because iron in moist air becomes rapidly oxidized after grinding. (As early as fifteen minutes after grinding, iron will lose its enhanced reactivity when exposed to moist air.) Therefore, after the initial grinding, grinding should continue onboard the vehicle or, alternatively, by periodically injecting freshly-ground iron fuel charges from sealed packets.

The freshly-ground reactive iron is easily deposited in a compartment in the vehicle. It is easily handled as sealed packet(s) of freshly-ground particulates, but, additionally, it can be freshly ground in situ aboard the vehicle. The particles range in diameter size from approximately 25 to 1,200 $\mu$m; an average-sized distribution is one in which at least twenty per cent (20%) of the particles are less than 300 $\mu$m in diameter. It is preferable that at least 50% are less than 300 $\mu$m in diameter. The average particle density ranges approximately from about 1 to 7.8 g/cc, with a non-compressed packed particle density ranging from about 1.5 to 3.5 g/cc. The particles have a surface area greater than approximately 0.001 meters$^2$/g.

The potassium hydroxide catalyst of this invention is truly unique. As the hydrogen generation of iron and steam is very old, one would expect that such a temperature-reducing catalyst would have been discovered a long time ago. It is also unusual since many compounds and materials have been tried, without much success.

The potassium hydroxide catalyst of this invention makes possible low-temperature reactors operating at or about 200° C. to 250° C.; hydrogen can be produced at high rates thereby without requiring large amounts of iron in the reactor. A low-temperature reaction of this type would normally require impractical amounts of iron in order to generate enough hydrogen at the usual low activity. However, this catalyst greatly enhances the rate of reaction between $H_2O$ and iron, thus reducing the amount of iron needed for reaction with the water. For example, when using high-temperature steam for the hydrogen generation, a medium-sized electrically-powered car which has its electricity generated by a hydrogen-air fuel cell might consume about fifty pounds of iron during a one-hour trip. In order to obtain the same amount of hydrogen from a steam reaction at 250° C., more than 400 pounds of heated iron would be required under present state-of-the-art methods; only about fifty pounds would actually react to form hydrogen. The added weight of the iron reduces mileage. The additional 350 pounds of iron would then need the requisite heat to bring it to operating temperature. In other words, the additional 350 pounds of iron would be nothing short of excess baggage. The need to carry and heat so much more iron than is stoichiometrically required is completely impractical.

To the best of Applicant's knowledge, no catalyst has been shown to be effective, practical and economical in accelerating the iron-water reaction at temperatures less than 400° C. Catalysts that have been tried without success include sodium chloride, sodium sulfate, zinc sulfate, zinc chloride, potassium sulfate, potassium chloride, lithium bromide, calcium chloride, potassium stannate, ferrous and ferric sulfate, ferrous chloride and ferric chloride.

The preferred concentration of the potassium hydroxide catalyst of this invention is approximately 53 grams of potassium hydroxide per 100 grams of solution.

At this concentration, operating at 230° C., a given quantity of iron reacts with water to form iron oxide at a per-minute conversion rate of 3.6%. This rapid conversion rate makes practical the use of iron to fuel electrical automobiles and other electrically-powered land vehicles.

It should be understood that while the other alkali hydroxides are effective catalysts, the use of the hydroxide of potassium is preferred. The hydroxides of cesium, rubidium and lithium are too expensive. The hydroxides of sodium and lithium form excessively stable ferrates with the iron, which is undesirable, because stable ferrates are difficult to decompose. They also reduce the amount of catalyst in solution. The formation of the excessively stable ferrates, therefore, poses problems in the replenishment of the catalyst, with attendant inconvenience and the additional costs of labor and materials.

SUMMARY OF THE INVENTION

In accordance with the new catalyst of this invention, there is also provided a method for operating an electrical automotive vehicle. The method of the invention comprises using a hydrogen-air fuel cell to power an electrical automotive vehicle having electrical drive motors.

Hydrogen to fuel the fuel cell is supplied onboard by a bed of iron that is made to react with water in the presence of an alkali hydroxide catalyst at temperatures not exceeding approximately 250° C. The preferred alkali hydroxide is the hydroxide of potassium in a range of concentrations between 50 to 60 percent by weight, with the preferred concentration being about 53%. The hydrogen for fueling the fuel cell is generated onboard the automobile, in situ, by using a reactor compartment containing the iron materials. The hydrogen is generated by passing water over the iron, which then becomes iron oxide. The vehicle's operator obtains a fresh charge of the iron materials from an iron fuel station for placement in a storage compartment of the vehicle which feeds the reactor compartment. The exchange of the iron oxide with a fresh iron charge at the fuel station can function in a manner that is similar to that of the current process for returning empty soda cans to a supermarket. For the spent iron (iron oxide), the fuel station would give the vehicle operator a cash allowance toward the purchase of a new iron charge. The old, spent iron would then be recycled into fresh iron by a reduction process at the fuel station or at a central distribution facility. The major difference between the supermarket recycling exchange scheme and the exchange system of this invention is that the exchange of iron materials is accomplished by the use of automated machinery, as is done at gasoline pumping stations.

The iron materials of this invention may comprise in situ freshly-ground particulates to further enhance the reaction. The freshly ground particles range in diameter size from approximately 25 to 1,200 $\mu$m; an average-sized distribution is one in which at least twenty per cent (20%) of the particles are less than 300 $\mu$m in diameter. It is preferable that at least 50% are less than 300 $\mu$m in diameter. The average particle density ranges approximately from about 1 to 7.8 g/cc, with a non-compressed packed particle density ranging from about 1.5 to 3.5 g/cc. The particles have a surface area greater than approximately 0.001 meters$^2$/g.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a method of powering an electrical vehicle by using a hydrogen-air fuel cell to generate the electricity needed to power the electrical drive motors. Hydrogen to supply the fuel cell is produced in situ, aboard the vehicle by passing low-temperature heated water over an iron bed contained in a reactor. The iron is bulk-loaded into the reactor; it may comprise freshly-ground particles of iron. The iron is caused to react with the water in the presence of an alkali hydroxide catalyst, which allows the reaction to proceed at temperatures below about 250° C.

Figure 1:
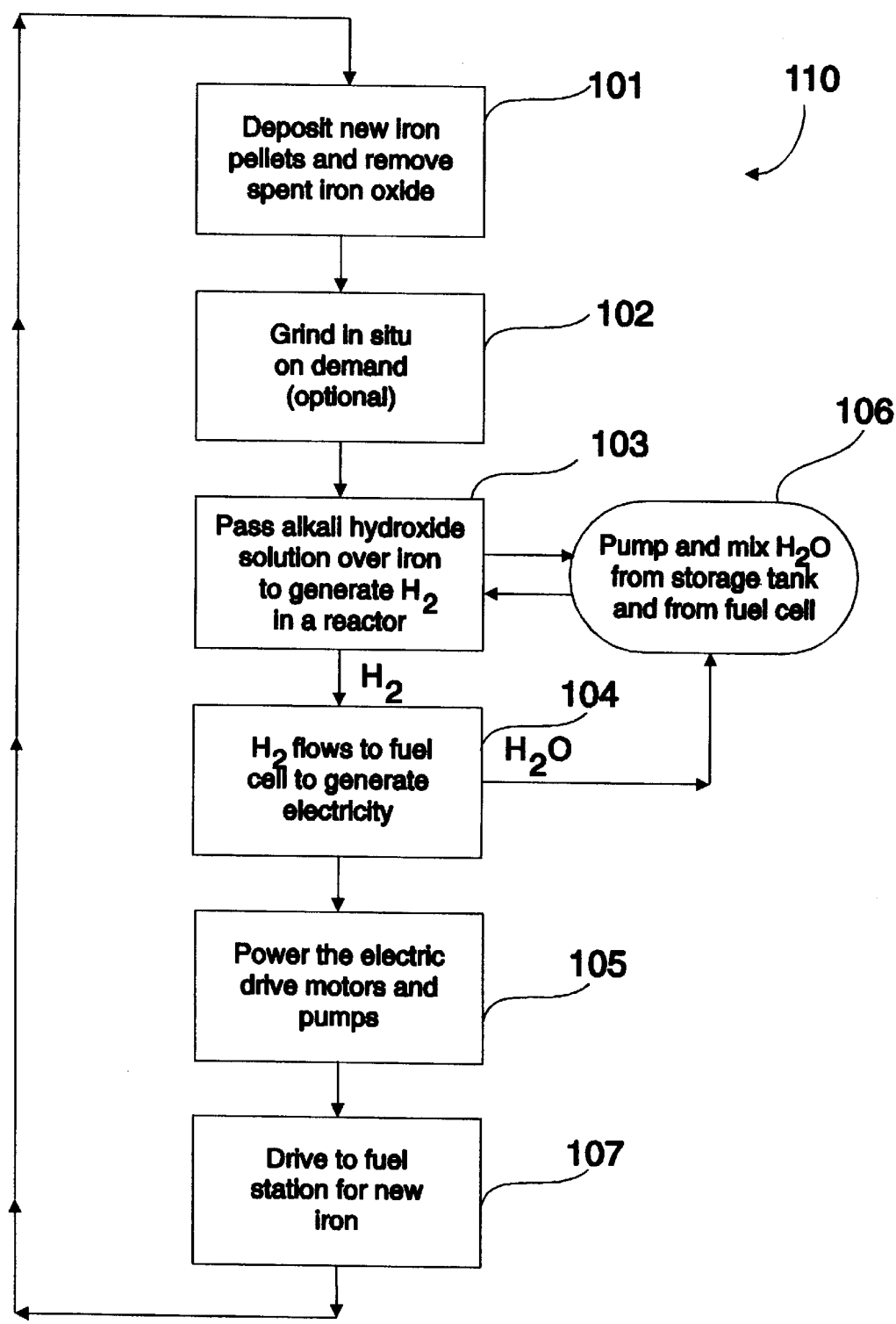
FIG. 1 illustrates a flowchart diagram of a method using the inventive catalyst of this invention.

Now referring to FIG. 1, a flowchart diagram 110 of the inventive method is shown. The operator of an electrical vehicle having electrical drive motors for driving the automobile obtains a fresh charge of iron from a fuel station, step 101. The spent iron (iron oxide) that is in the iron compartment is removed and replaced with the fresh charge of iron particles or pellets. The iron may be further enhanced in its reactivity with water by the continuous grinding of the iron particles in situ, step 102. (This is an optional step, since the catalytic reaction of this invention will proceed at desirable conversion rates, and at desirable temperatures, without the need to freshly grind the iron.) The reactor containing the iron can also be tumbled, so as to mix or stir the iron. The grinding of the iron within the compartment can be optionally used to make the iron more reactive, so that the conversion of the iron to iron oxide, which is measured in percent per minute (%/min.), can take place at lower-than-normal water temperatures and at still better- than-normal conversion rates, as illustrated below in Table 1, without the catalyst being present.

TABLE 1

| | (No Catalyst) | |
|---|---|---|
| H$_2$O Temp. (°C.) | Conv. Rate (Ground) | Conv. Rate (Unground) |
| 400 | 11.5 | 3.7 |
| 300 | 4.0 | 1.8 |
| 200 | 2.4 | 0.8 |

The vehicle is equipped with a hydrogen-air fuel cell that operates by a hydrogen-oxygen reaction to produce electricity and replacement water. The hydrogen is generated in situ by passing heated water or low-temperature steam (containing an alkali hydroxide catalyst) at, typically, between approximately 230° C. to 250° C. over the iron deposited in the reactor, step 103.

The alkali hydroxide catalyst used to enhance the reaction is preferably the hydroxide of potassium in a concentration in the approximate range of between 50 and 60% by weight. It should be understood that, while the other alkali hydroxides are effective catalysts, the use of the hydroxide of potassium is preferred. The hydroxides of cesium, rubidium and lithium are too expensive. The hydroxides of sodium and lithium form excessively stable ferrates with the iron, which is undesirable, because stable ferrates are difficult to decompose. They also reduce the amount of catalyst in solution. The formation of these excessively stable ferrates, therefore, poses problems in the replenishment of the catalyst, with attendant inconvenience and the additional costs of labor and materials. Other alkali hydroxides, however, can be used in some cases with the potassium hydroxide. The reaction is preferably conducted at temperatures ranging between approximately 200° C. and 250° C., as shown by the conversion rate in Table 2 hereinbelow.

The preferred concentration of the potassium hydroxide catalyst of this invention is approximately 53 grams of potassium hydroxide per 100 grams of solution.

At this concentration, operating at 235° C., a given quantity of commercial sponge iron powder reacts with water to form iron oxide at a per-minute conversion rate of 3.62%. This rapid conversion rate (measured in percent per minute) makes practical the use of iron to fuel electrical automobiles and other electrically-powered land vehicles.

TABLE 2

| Temp. °C. | Catalyst Type | Concentration | Conversion Rate |
|---|---|---|---|
| 230 | KOH | 56.2 | 2.02%/min. |
| 230 | KOH | 53.3 | 2.76 |
| 245 | KOH | 53.3 | 2.62 |
| 235 | KOH | 53.3 | 3.62 |
| 230 | NaOH | 53.0 | 0.98 |
| 235 | NaOH | 49.0 | 1.00 |
| 200 | NaOH | 60.0 | 0.60 |
| 230 | NaOH | 60.0 | 0.95 |

The generated hydrogen flows to the hydrogen-air fuel cell, step 104, where electricity is generated, along with a water by-product. The by-product water is then pumped to a water tank and used, step 106, to replenish at least some of the water used to generate the hydrogen in step 103. The generated electricity of the fuel cell is used to power the drive motors of the vehicle and the pumps and accessories of the system, step 105. The operator of the vehicle eventually drives to the fuel station, step 107, to obtain a new charge of iron when the majority of the fuel (iron) has been spent (i.e., converted to iron oxide). The automotive power process is then essentially repeated.

Figure 2:
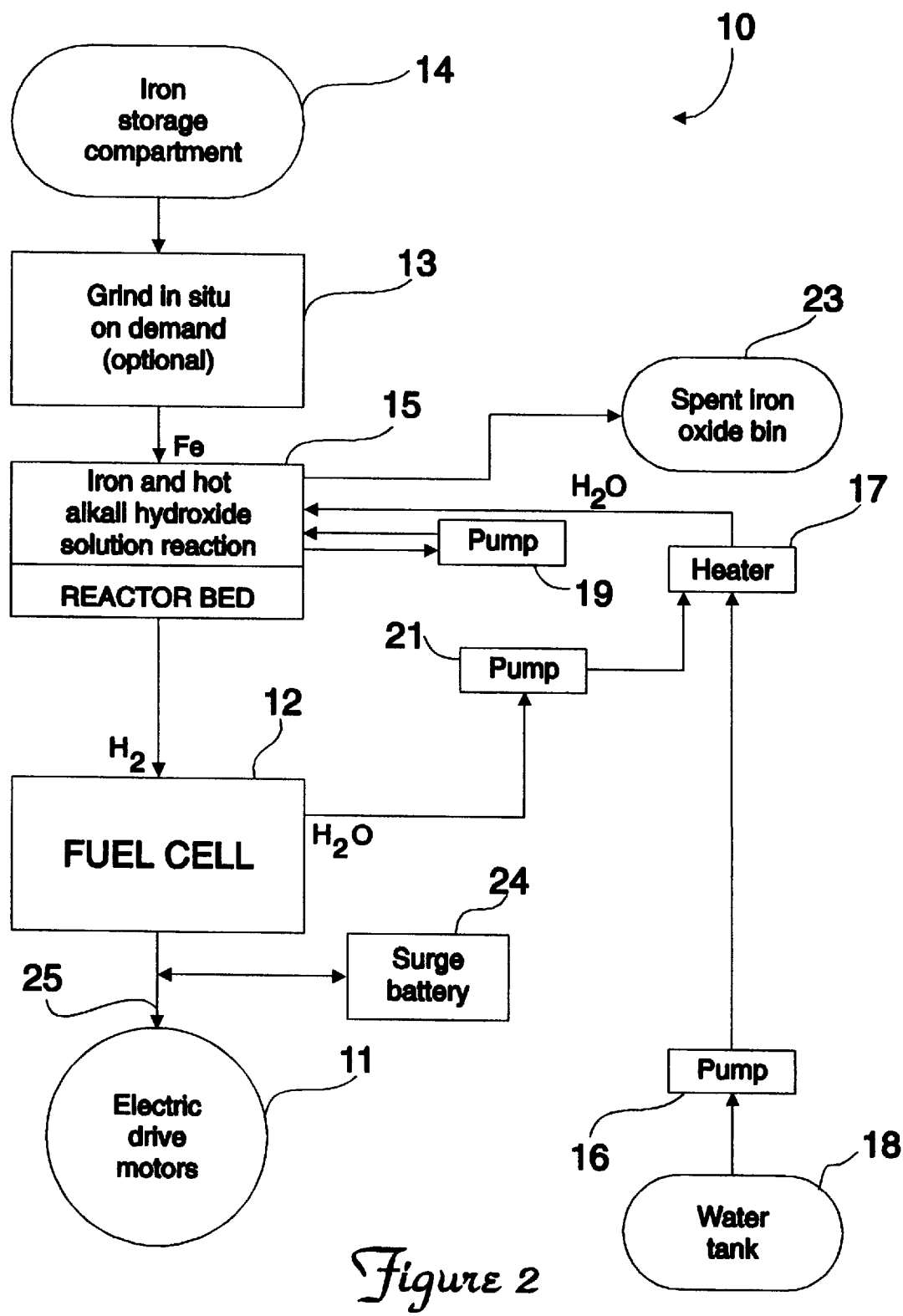
FIG. 2 depicts a schematic diagram of the system of an electrical vehicle that utilizes the new catalyst of the invention.

Referring to FIG. 2, a schematic diagram 10 of the system for an electrical vehicle utilizing this invention is shown. The vehicular system comprises a number of drive motors 11 that receive their electrical power from a hydrogen-air fuel cell 12, over line 25. The hydrogen-air fuel cell 12 receives the hydrogen necessary for its hydrogen-oxygen reaction from an iron-water reactor 15. The iron from a storage compartment 14 is fed to an iron bed disposed in the reactor 15. A grinding apparatus 13 can optionally refresh the iron fed from the iron storage compartment 14 to the reactor 15. Water is pumped from a water tank 18 via pump 16 to the iron bed compartment 14 via a diluter (not shown). The diluter contains a circulating aqueous solution of alkali hydroxide (the catalyst); water is delivered to the iron-water-catalyst reactor by the circulating solution, is consumed in part through the iron-water reaction, and replenished with fresh water in the diluter before circulating back to the reactor. The water is initially heated to the proper temperature for reaction by (for example) a heating coil heater 17 and is pumped (via circulating pump 19) and recirculated to the diluter (not shown) and from there to the iron bed 15. The hydrogen that is produced in compartment 15 flows to the fuel cell 12 in order to produce electricity. Once the reaction is proceeding, heating the water can also be done in part or in whole from the exotherm of the iron-water reaction or from fuel cell waste heat.

In producing the electricity, the fuel cell 12 provides water as a by-product. This by-product water is pumped via pump 21 to the heater 17, in order to replenish the water pumped to reactor 15 via the diluter. Additional water may have to be periodically added to tank 18 so as to maintain a proper supply level. The electricity produced by the fuel cell 12 is also used to power the respective pumps 16, 19 and 21, as well as the coil heater 17 when that heater is needed. (For purposes of clarity, suitable electrical connections among fuel cell 12 and electrically-driven components are not shown in FIG. 2.)

A surge battery 24 can be used to supply or absorb power during the initial, start-up sequence of operation; peak load demands; at idle; and braking. This battery 24 can be recharged by the fuel cell 12 during steady-state operation and by regenerative braking.

A spent-iron bin 23 receives the iron oxide from the reactor 15. The spent iron is emptied periodically, usually at the time of refueling.

The reactor 15 generally comprises one or more tubes, not shown, that are filled with a porous or powdered metal. The tubes are preferably made from materials that conduct heat, although in certain embodiments of the present invention (whereby start-up heat is generated internally, such as by air injection), heat-conductive materials are not necessary. Preferably, the tubes are made from materials such as inconel, stainless steel or Teflon® material. The size of the tubes will, of course, depend upon the size of the generating system. However, they generally have an inside diameter of at least about ¼ inch (0.635 cm) and a length of at least about 6 inches (15 cm). The number of tubes will also vary, depending upon the size of the system. The general range is from about 1 to 100 tubes; the more preferable range is from about 1 to 5. The tubes may also be of varying sizes and shapes, including curves, spirals, etc. The tubes may also be disposed at various angles.

The iron materials of this invention can comprise in situ freshly-ground particulates. The particles range in diameter size from approximately 25 to 1,200 $\mu$m; an average-sized distribution is one in which at least twenty per cent (20%) of the particles are less than 300 $\mu$m in diameter. It is preferable that at least 50% are less than 300 $\mu$m in diameter. The average particle density ranges approximately from about 1 to 7.8 g/cc, with a non-compressed packed particle density ranging from about 1.5 to 3.5 g/cc. The particles have a surface area greater than approximately 0.001 meters$^2$/g.

To initiate the reaction, the water in the container 18 is heated. The water flows into and reacts with the metal reactant to produce a metal oxide, such as $Fe_3O_4$, and hydrogen gas.

One way to start the hydrogen-producing reaction is to inject catalyzed solution and air into the reactor zone, so that the rapid oxidation of the metal and the catalytic burning of the hydrogen (produced by the reacting water) will help heat the metal reactor up to the necessary temperature for reaction. Another way to supply the necessary start-up heat is to burn a small amount of conventional fuel (such as compressed natural gas, propane or gasoline) in a separate burner, employing a suitable means to transport the generated heat. A simple source of start-up heat may be a small storage battery that furnishes power to a heating bulb or heating coil that is disposed within or adjacent to the energy-producing device.

A more complex scheme for supplying start-up heat to the reactor zone is to employ a plurality of reactor beds in the reaction zone (such as elongated tubes of metal reactant), with at least either one small reactor bed or beds of graduated sizes. The smallest bed is brought up to operating temperature first with a battery or a small burner; the hydrogen it produces is burned with air to form water in the fuel-cell chamber, so as to heat up the larger reactor beds.

In the case of beds of graduated sizes, the hydrogen produced by the next larger bed may be used to heat up the next larger bed, etc.

One of the advantages of the present invention over other hydrogen production systems (including metal-hydride-based systems) is its ability to regenerate or reform the spent metal oxide after completion of the reaction and the production of hydrogen. This advantage is even more significant because of the relatively low cost involved in the regeneration of spent metal oxide. The system of the present invention may employ a variety of methods to regenerate the spent metal oxide, some of which are already commercially in use.

One method of regeneration comprises reacting the spent metal oxide with a reducing gas, a mixture of gases or a liquid. Because of its relatively low cost, the presently preferred reducing agent is reformed natural gas. This gas generally comprises a mixture of hydrogen, carbon monoxide, carbon dioxide and residual steam. While hydrogen and carbon monoxide are the only active reducing agents, the metal/metal oxide bed that is being regenerated is not irreversibly harmed by the presence of the other two components. If hydrogen gas is available at a lower cost than reformed natural gas, it, too, could be used. In most cases, heat is added to the reaction, because the regeneration process is somewhat endothermic. Where available, relatively pure carbon monoxide can also be used as a reducing agent.

The gaseous reducing agents may be supplied as a reformed liquid fuel such as reformed methanol, reformed ethanol, reformed petroleum derivatives and reformed or decomposed ammonia.

The reformed fuels may be derived by various techniques including: (1) steam-reforming (in which the fuel in gaseous form reacts with steam); (2) partial oxidation (in which the fuel reacts with oxygen or air in proportions less than that needed for complete oxidation); or (3) autothermal reforming (in which the fuel partially reacts with steam and partially with oxygen or air). In terms of yield of hydrogen per unit of fuel, steam-reforming is more efficient than partial oxidation. Steam-reforming is endothermic, while partial oxidation is exothermic. With regard to both hydrogen yield and heat addition/removal, autothermal reforming falls between steam-reforming and partial oxidation. The selection of a particular reforming process will thus be made for a particular operation based upon factors which include the hydrogen yield required, equipment costs and complexity, and the overall process heat requirements.

Heat must be supplied to the reduction reaction, since the reduction reaction is generally endothermic, taking place at about 800° C. to 1,100° C. One method of doing this is to inject air or oxygen into the reactor bed. This causes some of the reducing agent to burn, thereby heating up the regeneration reaction zone, i.e., autothermal reforming. Another method is to burn the vent gas from a hydrogen-producing reaction and transfer its combustion heat to the regeneration reaction zone through the walls of the reactor. Still another method is to burn part of the reducing agent upstream of the reforming device and transfer the combustion heat across the reactor bed walls of the metal/metal-oxide containing reactor. Still another scheme for supplying the necessary heat to maintain the regenerating reaction is to burn vent gas from another nearby regenerating bed. This vent gas normally contains steam, carbon dioxide and unreacted reformate.

In general, the vent gas from the reaction between iron oxide and reformate does not only produce a mixture of water and carbon dioxide. The equilibrium composition of the vent gas also includes unreacted hydrogen and unreacted carbon monoxide. Some of the unreacted reducing mixture can be burned, so as to satisfy the endothermic need of either the iron oxide reaction or the reformer reaction, but if all of it were burned or vented, the overall efficiency would go down. To avoid this, some water may be condensed from the vent gas; the resulting, drier mixture may then be fed to a second-stage iron oxide regenerator to produce more elemental iron. The vent gas of the second stage would then be burned to provide the needed endotherms, and the overall efficiency would be better than that of a single-stage regenerator.

The reformation process may be carried out at a location away from the fuel station, such as at a central plant. The metal and spent metal oxides may be transferred to and from refueling stations near the site of the central station. The metal powder or material is preferably conveyed into and out of the metal-water reaction chamber 14 during refueling by a suitable means, such as gravity flow. The metal and metal oxides are transferred from the refueling stations to the central reforming plant by a variety of means (including trucking, railroad car and the like). The recycling of the metal reactant can theoretically occur an infinite number of times.

As an alternative to using a relatively large, removed central processing facility for reforming the spent metal oxide, smaller reformer units at the site of the refueling station may be used. As with the centralized reforming unit, the on-site reforming units may be used to convert the spent metal oxide to metal reactant (as previously described) by using, for example, reformed natural gas. The reduced metal may then immediately be used to generate hydrogen in a hydrogen-powered device; stored for subsequent use to generate hydrogen in such a device; or used as an intermediate storage device, in conjunction with metal hydride storage beds. A convenient way to utilize the reduced metal as an intermediate storage device in combination with a metal hydride bed is to react the reduced metal with steam to produce slightly wet hydrogen. The hydrogen is then dried by suitable means known in the art, such as by desiccants.

A small amount of hydrogen generated from the iron-water reaction can be compressed and stored for start-up/heat-up purposes. The hydrogen is diverted by means of a solenoid valve that is controlled by a pressure sensor or pressure switch. The hydrogen storage device acts like a storage battery, supplying energy during start-up and absorbing it during normal driving for later use.

During the regeneration of spent metal oxide, the reformed natural gas may contain sulfur impurities, which may accumulate in the bed over many regeneration cycles. The sulfur will react with the metal reactant, creating metal sulfides. The metal sulfides might not decompose either by steam upon discharge or by fuel or reformate upon recharge. This will eventually irreversibly tie up a large fraction of the metal reactant bed as metal sulfides instead, thereby preventing it from switching from metal oxide to elemental metal. In order to overcome this contamination problem, unwanted metal sulfide (e.g., FeS) can be converted to sulfur dioxide ($SO_2$) and some metal oxide (e.g., one of the iron oxides) by briefly (i.e., in 1 to 15 minutes) passing a stream of air over the heated bed of spent metal oxide before that bed is reduced to elemental metal. Since the bed must be heated anyway, in order to regenerate it, little or no additional heating is needed to remove the metal sulfide by hot air oxidation. The risk of explosion during transition through the bed from air to reformate or fuel can be significantly reduced by briefly purging the bed with low-temperature steam, carbon dioxide, nitrogen or any other suitable inert gas. In particular, the mixture of low-temperature steam and $CO_2$ from another bed undergoing regeneration is a readily available, essentially cost-free, purging agent.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An improved $H_2O$—iron reaction method, comprising reacting $H_2O$ and iron material to form hydrogen in situ, aboard an electrical vehicle, in the presence of a catalyst comprising a dissolved alkali metal hydroxide, said alkali metal hydroxide enhancing said $H_2O$—iron reaction.

2. The method in accordance with claim 1, wherein said iron material comprises particles ranging in diameter size from approximately 25 to 1,200 $\mu$m, with an average-sized distribution having at least twenty per cent (20%) of the particles less than 300 $\mu$m in diameter, and having an average particle density ranging approximately from about 1 to 7.8 g/cc, and a surface area greater than approximately 0.001 meters$^2$/g.

3. The method in accordance with claim 1, wherein said alkali hydroxide catalyst is potassium hydroxide.

4. The method in accordance with claim 3, wherein said potassium hydroxide is in a concentration of approximately 50–60% by weight.

5. The method in accordance with claim 4, wherein said potassium hydroxide is in a concentration of approximately 53% by weight.

6. The method in accordance with claim 1, wherein said iron particles have a non-compressed packed particle density ranging from about 1.5 to 3.5 g/cc.

7. The method in accordance with claim 1, wherein at least 50% of the particles are less than 300 $\mu$m in diameter.

8. The method in accordance with claim 1, wherein said iron particles comprise a packet of particles for use as a refresher charge in an electrical vehicle.

9. A catalyst reaction, for use in situ with a hydrogen-air fuel cell to generate the hydrogen to fuel said fuel cell, comprising the steps of:

mixing iron material with $H_2O$ in the presence of a catalyst, said catalyst comprising a dissolved alkali metal hydroxide catalyst, said iron reacting with said $H_2O$ and having enhanced reactivity with said $H_2O$ as a result of said alkali metal hydroxide catalyst, with said alkali metal hydroxide catalyst allowing a reaction of said iron with said $H_2O$ to take place at temperatures below 250° C., at a conversion rate exceeding 2.0%/minute conversion of iron to iron oxide.

10. The catalyst reaction in accordance with claim 9, wherein said iron particles range in diameter size from approximately 25 to 1,200 $\mu$m, with an average-sized distribution having at least fifty per cent (50%) of the particles less than 300 $\mu$m in diameter, and having an average particle density ranging approximately from about 1 to 7.8 g/cc, and a surface area greater than approximately 0.001 meters$^2$/g, said particles being freshly ground in situ for enhancing their reactivity in producing hydrogen for said fuel cell.

11. The catalyst reaction in accordance with claim 9, wherein said iron particles have a non-compressed packed particle density ranging from about 1.5 to 3.5 g/cc.

12. The catalyst reaction in accordance with claim 9, wherein said iron particles comprise a packet of particles for use as a refresher charge in an electrical vehicle.

13. The catalyst reaction in accordance with claim 9, wherein said alkali hydroxide catalyst is potassium hydroxide.

14. The catalyst reaction in accordance with claim 13, wherein said potassium hydroxide is in a concentration of approximately 50–60% by weight.

15. The catalyst reaction in accordance with claim 14, wherein said potassium hydroxide is in a concentration of approximately 53% by weight.

16. An improved $H_2O$—iron reaction method, comprising the steps of:

reacting $H_2O$ and iron material to form hydrogen in the presence of a catalyst comprising a dissolved alkali metal hydroxide, said alkali metal hydroxide enhancing said $H_2O$—iron reaction; and allowing said reaction to proceed at temperatures below approximately 250° C., at a conversion rate of iron to iron oxide exceeding 2%/minute.

17. The method in accordance with claim 16, wherein said iron material comprises particles ranging in diameter size from approximately 25 to 1,200 $\mu$m, with an average-sized distribution having at least twenty per cent (20%) of the particles less than 300 $\mu$m in diameter, and having an average particle density ranging approximately from about 1 to 7.8 g/cc, and a surface area greater than approximately 0.001 meters$^2$/g.

18. The method in accordance with claim 16, wherein said alkali hydroxide catalyst is potassium hydroxide.

19. The method in accordance with claim 18, wherein said potassium hydroxide is in a concentration of approximately 50–60% by weight.

20. The method in accordance with claim 19, wherein said potassium hydroxide is in a concentration of approximately 53% by weight.

21. The method in accordance with claim 16, wherein said iron particles have a non-compressed packed particle density ranging from about 1.5 to 3.5 g/cc.

22. The method in accordance with claim 16, wherein at least 50% of the particles are less than 300 $\mu$m in diameter.

23. The method in accordance with claim 16, wherein said iron particles comprise a bulk loading of particles for use as a refresher charge in an electrical vehicle.

24. A catalyzed reaction for generating hydrogen which utilizes iron that is brought into contact with $H_2O$ in the presence of a dissolved alkali metal hydroxide catalyst, said alkali metal hydroxide catalyst allowing a reaction of said iron with said $H_2O$ to take place at temperatures below 250° C., at a reaction rate exceeding 2.0%/minute conversion of iron to iron oxide.

25. The catalyzed reaction in accordance with claim 24, wherein said iron particles range in diameter size from approximately 25 to 1,200 μm, with an average-sized distribution having at least fifty per cent (50%) of the particles less than 300 μm in diameter, and having an average particle density ranging approximately from about 1 to 7.8 g/cc, and a surface area greater than approximately 0.001 meters$^2$/g, said particles being freshly ground in situ for enhancing their reactivity in producing hydrogen for a fuel cell.

26. The catalyzed reaction in accordance with claim 24, wherein said iron particles have a non-compressed packed particle density ranging from about 1.5 to 3.5 g/cc.

27. The catalyzed reaction in accordance with claim 24, wherein said iron particles comprise a packet of particles for use as a refresher charge in an electrical vehicle.

28. The catalyzed reaction in accordance with claim 24, wherein said alkali hydroxide catalyst is potassium hydroxide.

29. The catalyzed reaction in accordance with claim 28, wherein said potassium hydroxide is in a concentration of approximately 50–60% by weight.

30. The catalyzed reaction in accordance with claim 29, wherein said potassium hydroxide is in a concentration of approximately 53% by weight.

* * * * *